(12) United States Patent
Bragdon

(10) Patent No.: US 9,317,257 B2
(45) Date of Patent: Apr. 19, 2016

(54) FOLDED VIEWS IN DEVELOPMENT ENVIRONMENT

(71) Applicant: Microsoft Technology Licensing, LLC, Redmond, WA (US)

(72) Inventor: Andrew C. Bragdon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/689,179

(22) Filed: Apr. 17, 2015

(65) Prior Publication Data

US 2015/0227349 A1  Aug. 13, 2015

Related U.S. Application Data

(63) Continuation of application No. 13/530,132, filed on Jun. 22, 2012, now Pat. No. 9,026,992.

(51) Int. Cl.
*G06F 9/44* (2006.01)
*G06F 3/0484* (2013.01)

(52) U.S. Cl.
CPC .............. *G06F 8/33* (2013.01); *G06F 3/04842* (2013.01); *G06F 8/34* (2013.01)

(58) Field of Classification Search
CPC ........................................................ G06F 8/33
See application file for complete search history.

(56) References Cited

U.S. PATENT DOCUMENTS

| | | | |
|---|---|---|---|
| 6,026,362 A | 2/2000 | Kim et al. | |
| 6,282,701 B1 | 8/2001 | Wygodny et al. | |
| 6,349,406 B1 | 2/2002 | Levine | |
| 6,442,576 B1 | 8/2002 | Edelman et al. | |
| 6,721,941 B1 | 4/2004 | Morshed et al. | |
| 6,728,949 B1 | 4/2004 | Bryant | |
| 6,748,583 B2 | 6/2004 | Aizenbud-Reshef et al. | |
| 6,857,120 B1 | 2/2005 | Arnold et al. | |
| 7,111,283 B2 | 9/2006 | Fraser et al. | |
| 7,120,901 B2 | 10/2006 | Ferri et al. | |
| 7,174,536 B1 | 2/2007 | Kothari et al. | |
| 8,209,605 B2 | 6/2012 | Poston et al. | |
| 8,356,275 B2 * | 1/2013 | Nagaoka | 717/105 |
| 2002/0087949 A1 | 7/2002 | Golender et al. | |
| 2003/0079199 A1 * | 4/2003 | Barsness et al. | 717/100 |

(Continued)

FOREIGN PATENT DOCUMENTS

WO        0125912 A1    4/2001

OTHER PUBLICATIONS

"How to: Outline and Hide Code", Retrieved at <<http://msdn.microsoft.com/en-us/library/td6a5x4s%28v=vs.80%29.aspx>>, Sep. 14, 2008, pp. 6.

(Continued)

*Primary Examiner* — Philip Wang

(74) *Attorney, Agent, or Firm* — Kevin Sullivan; Kate Drakos; Micky Minhas

(57) ABSTRACT

Aspects of the subject matter described herein relate to folded views for a development environment. In aspects, a software development environment may display a code segment that includes references to other code segments or other data. A developer may select a reference and indicate that a folded view is to be shown for the data corresponding to the reference. In response, the software development environment may obtain the data corresponding to the folded view and display the data inline with the code segment.

20 Claims, 9 Drawing Sheets

(56) References Cited

U.S. PATENT DOCUMENTS

| | | | |
|---|---|---|---|
| 2003/0088854 | A1 | 5/2003 | Wygodny et al. |
| 2005/0028107 | A1* | 2/2005 | Gomes et al. .................. 715/762 |
| 2005/0044528 | A1 | 2/2005 | Olsen |
| 2005/0273757 | A1 | 12/2005 | Anderson |
| 2007/0006155 | A1 | 1/2007 | Maennel et al. |
| 2007/0006165 | A1 | 1/2007 | Lam et al. |
| 2007/0219945 | A1 | 9/2007 | Wang et al. |
| 2007/0260613 | A1 | 11/2007 | Ippili et al. |
| 2008/0313573 | A1 | 12/2008 | Nelson |
| 2008/0320442 | A1 | 12/2008 | Lyon-Smith |
| 2009/0241098 | A1 | 9/2009 | Lobo et al. |
| 2011/0197178 | A1 | 8/2011 | Johnston |
| 2011/0271258 | A1* | 11/2011 | Park et al. ...................... 717/127 |
| 2011/0302166 | A1 | 12/2011 | Moriya et al. |
| 2011/0302556 | A1 | 12/2011 | Drukman et al. |
| 2012/0084644 | A1 | 4/2012 | Robert et al. |
| 2012/0284689 | A1* | 11/2012 | Armstrong et al. ........... 717/113 |
| 2012/0311533 | A1* | 12/2012 | Fanning et al. ................ 717/111 |

OTHER PUBLICATIONS

Johnson, Duane, "Wishful thinking: a text editor that expands function applications into function definitions", Retrieved at <<http://haskell.1045720.n5.nabble.com/Wishful-thinking-a-text-editor-that-expands-function-applications-into-function-definitions-td3131174.html>>, Retrieved Date: Apr. 13, 2012, pp. 10.

"Tracer", Retrieved at <<http://planet.racket-lang.org/package-source/tracer/tracer.plt/1/1/planet-docs/tracer/index.html>>, Retrieved Date: Apr. 13, 2012, p. 1.

PCT International Search Report and Written Opinion for Application No. PCT/US2013/046929, European Patent Office, Mailed: Sep. 20, 2013, 9 pages.

U.S. Appl. No. 13/530,132, Non-Final Rejection, dated Mar. 24, 2014, 12 pages.

U.S. Appl. No. 13/530,132, Amendment dated Jun. 10, 2014, 12 pages.

U.S. Appl. No. 13/530,132, Final Rejection dated Jun. 25, 2014, 7 pages.

U.S. Appl. No. 13/530,132, Response After Final Rejection dated Dec. 26, 2014, 7 pages.

U.S. Appl. No. 13/530,132, Notice of Allowance dated Jan. 7, 2015, 7 pages.

Hofer, Christopher, "Design and Implementation of a Backward-In-Time Debugger", 2006, pp. 1-17.

"VisiComp", History View, last viewed on Mar. 9, 2007 at http://www.visicomp.com/product/retrovue/historyview.html, 2 pages.

Gestwicki, et al., "Methodology and Architecture of JIVE", pp. 95-104, 2005.

Cabeza et al., "The Interactive Debugger", Ciao System, Version: 1:10#6, Jul. 8, 2004, pp. 1-11. http://clip.dia.fi.upm.es/Software/Ciao/ciao_html/ciao_8.html.

U.S. Appl. No. 11/820,927, Non-Final Rejection dated Nov. 12, 2010, 23 pages.

U.S. Appl. No. 11/820,927, Amendment dated Feb. 10, 2011, 13 pages.

U.S. Appl. No. 11/820,927, Notice of Allowance dated Sep. 16, 2011, 13 pages.

European Patent Application No. 13 734 590.6 (foreign counterpart application to U.S. Appl. No. 14/689,179), Response to Office Communication, dated Jul. 14, 2015, 18 pages.

* cited by examiner

FIG. 2

```
FILE EDIT VIEW ....    205                                                      ⊠

[TestMethod]
    public void TestGetPeopleForOne()
    {
                                              ╭─220
        People people = new People();
        ArrayList arrayList = people.GetPeople(1);

Assert.AreEqual(1, arrayList.Count);
    }

Public PeopleUnitTest()
    {
        //
        // TODO:   Add constructor logic here
        //
    }

Public TestContext TestContext
    {
        Get
        {
            return testContextInstance;
        }
        Set
        {
            testContextInstance = value;
        }
    }
```

```
FILE EDIT VIEW ....   205                                                              315

[TestMethod]
public void TestGetPeopleForOne()
{
    People people = new People();
    ArrayList arrayList = people.GetPeople(1);
    Public ArrayList GetPeople(int number)                          ← 325
    {
        ArrayList people = new ArrayList();
        for (int i = 1; i <= number; i++)
        {
            string companyName = "";
            string fullName = "";
            this.fullNames = GetNames(this.resourceManager, "fullNames");
            fullName = (string)this.fullNames[i];
            this.companyNames = GetNames(this.resourceManager, "companyNames");
            companyName = (string)this.companyNames[i];
            people.Add(new Person(fullName, companyName));
        }
        // Return our list of people
        Return people;
    }
    Assert.AreEqual(1, arrayList.Count);
}
Public PeopleUnitTest()
{
    //
    // TODO:  Add constructor logic here
```

```
FILE EDIT VIEW ...

if (CurrentState.CanChangeItems) {
OrderLine lineItem = new OrderLine(cartItem.DateAdded,cartItem.Quantity,item);
public OrderLine(DateTime dateAdded, int quantity, Product product) {
    _dateAdded = dateAdded;
    _quantity = quantity;
    _item = product;
    InitializeDateTime(_dateAdded);
public void InitializeDateTime(DateTime time)
{
    this.DiscountAmount = 0;
    this.DiscountReason = "—";
    this.DateCreated = time;
    this.currentstate = new NewOrder(this);
    ValidateForCheckout();
}
}
this.Items.Add(lineItem);
VerifyNewestOrderDate(dateAdded);
public void VerifyNewestOrderDate(DateTime time)
{
    if (time == null)
    {
        return;
    }
    // TODO: Don't forget to implement this!
}
```

FIG. 7

```
File Edit View ...   305 for (int i = 1; i <= number; i++)
{
    string companyName = "";
    string fullName = "";

//Get a list of all full names
    this.fullNames = GetNames(this.resourceManager, "fullNames");
    LAST WEEK (6)
    113966  Hyrum:    Reordered ticks
    113964  Hyrum:    Added a GUID column
    113963  Kimball:  Allow saving of additional information
    113959  Kimball:  Save operation is now async
    113954  James:    Adds commands tick time data
    113953  James:    Adds support to save command
    OLDER (2)
    113172  Isaac:    Adding analytics
    113171  Isaac:    Adding folder
    fullName = (string)this.fullNames[i];

//Get a list of all company names
    this.companyNames = GetNames(this.resourceManager, "companyNames");
    companyName = (string)this.companyNames[i];
    people.Add(new Person(fullName, companyName));
}
```

300
315
320
325

FOLDED VIEWS IN DEVELOPMENT ENVIRONMENT

CROSS-REFERENCE TO RELATED APPLICATIONS

This application claims priority to and is a continuation of co-pending U.S. patent application Ser. No. 13/530,132 entitled "Folded Views in Development Environment" and filed Jun. 22, 2012, which is incorporated herein by reference.

BACKGROUND

In developing software, a software developer is often navigating between files that include the code of the software. For example, a developer may open one file, view code, find that the code calls code in another file, open the other file, navigate to the code, view that code, find that it calls code in yet another file, and so forth. Navigating in this manner is cumbersome and time consuming.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to folded views for a development environment. In aspects, a software development environment may display a code segment that includes references to other code segments or other data. A developer may select a reference and indicate that a folded view is to be shown for the data corresponding to the reference. In response, the software development environment may obtain the data corresponding to the folded view and display the data inline with the code segment.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements.

BRIEF DESCRIPTION OF THE DRAWINGS

FIGS. 2-7 are block diagrams of exemplary data shown in exemplary graphical interfaces in accordance with aspects of the subject matter described herein;

FIGS. 4-7 are block diagrams of additional exemplary user interface windows in accordance with aspects of the subject matter described herein.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like. Thus, where the term function is used, in alternative embodiments, the word function is to be replaced by each of the terms above.

Computer storage media as used herein includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer. Computer storage media does not include communication media.

Headings are for convenience only; information on a given topic may be found outside the section whose heading indicates that topic.

Other definitions, explicit and implicit, may be included below.

Exemplary Embodiments

Figure 1:
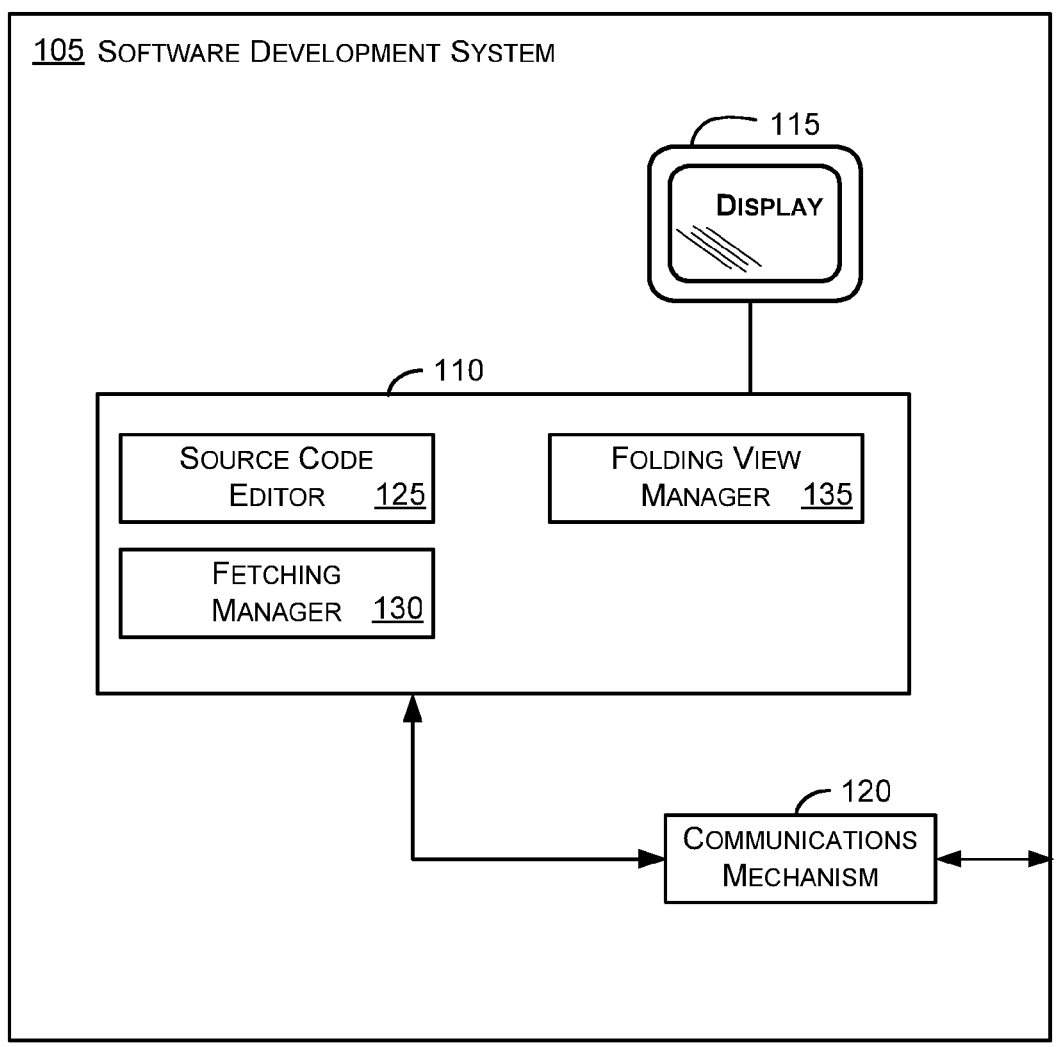
FIG. 1 is a block diagram that represents an exemplary system in which aspects of the subject matter described herein may operate.

FIG. 1 is a block diagram that represents an exemplary system in which aspects of the subject matter described herein may operate. The components illustrated in FIG. 1 are exemplary and are not meant to be all-inclusive of components that may be needed or included. In other embodiments, the components and/or functions described in conjunction with FIG. 1 may be included in other components (shown or not shown) or placed in subcomponents without departing from the spirit or scope of aspects of the subject matter described herein. In some embodiments, one or more of the components described in conjunction with FIG. 1 may be distributed across multiple devices that may be located closely together (e.g., on a local network) or spread apart (e.g., in different places on the Internet).

Aspects of the subject matter described herein may be implemented with general purpose or special purpose computing system environments or configurations. Examples of computers that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

One or more of the components described herein may operate in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

Although some of the discussion herein has referenced software development systems, the teachings herein may also be applied to other environments such as a word processor, browser, or other environment. For example, in a word processor, one part of a document may refer to text, graphics, or other data found in another part of the document or even in another document. In this example, a folded view may be provided to show the text, graphics, or other data. As another example, a browser may display a hyperlink that references other data. In this example, the other data may be obtained and shown in a folded view.

In one example, one or more of the components illustrated in FIG. 1 or components accessed by those components may be hosted in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

The examples above are not intended to be all-inclusive or exhaustive. Indeed, based on the teachings herein, those skilled in the art may recognize many other environment in which the teachings herein may be applied without departing from the spirit or scope of aspects of the subject matter described herein.

Turning to FIG. 1, the software development system 105 may include development components 110, a display 115, a communications mechanism 120, and other components (not shown). The development components 110 may include a source code editor 125, a fetching manager 130, a folding view manager 135, and other components (not shown). As used herein, the term component is to be read to include all or a portion of one or more devices, a collection of one or more software modules or portions thereof, some combination of one or more software modules or portions thereof and one or more devices or portions thereof, and the like.

The software development environment 105 is operable to receive input for software development activities. Software development activities may include any activities a developer may take to create, modify, test, compile, debug, measure, or otherwise interact with software.

The communications mechanism 120 allows components of the software development system 105 to communicate with other components outside the software development system 105. For example, the communications mechanism 120 may allow communication with the code server, a bug tracking database, a file server, another entity, or the like. The communications mechanism 120 may be a network interface or adapter, a modem, or any other mechanism for establishing communications.

The display 115 is an output device that can be used to display data in a visual manner. The display may implement or be part of a graphical interface by which a software developer can view code and information about the code. A graphical interface may display text, icons, pixels, controls, other graphical elements, and the like. In another embodiment, other output devices may be used such as a Natural User Interface described in more detail below.

The fetching manager 130 may be operable to obtain code or other data corresponding to a folded view. In one implementation, the fetching manager 130 may obtain the code or other data when a graphical element that represents the folded view is displayed on the display 115. In another implementation, the fetching manager 130 may obtain the code or other data when in response to receiving an indication (e.g., a mouse click or other input) that the folded view is to be expanded.

The source code editor 125 may operate to receive editing instructions related to code. Some examples of code and other data that may be edited via the source code editor 125 include those shown in FIGS. 2-7.

FIGS. 2-7 are block diagrams of exemplary data shown in exemplary graphical interfaces in accordance with aspects of the subject matter described herein. Turning to FIG. 2, in one example, the window 200 may include a menu 205, a pane 215, and other elements.

In general, an element (sometimes called a control) may be composed of zero or more other elements. For example, an element may include zero or more other elements which may include zero or more other elements and so forth. Furthermore, it will be recognized, that the window 200 may have more, fewer, or other elements which may be arranged in a variety of ways without departing from the spirit or scope of the subject matter described herein.

As shown in FIG. 2, the menu 205 may include menu items such a file, edit, view, and other menu items as desired. Selecting a menu item may cause a submenu to appear which provides additional menu items to select from. Menu items in a submenu may cause additional submenus to appear and so forth.

The pane 315 displays a code segment of a program of a software development environment. A code segment includes one or more lines of code. In one example, the method Get-People 220 is highlighted by underlining. In other examples, other forms of highlighting may be used such as bolding, different color, blinking, different size or font, and icon placed near the text, and the like. In one embodiment, the method GetPeople 220 is not highlighted.

The method GetPeople 220 may be defined in a code segment elsewhere in the program. Elsewhere may include, for example, in another place in the same or different file, class, method, code repository, or the like. The editor may receive input that indicates that the method GetPeople 220 is to be shown in a folded view. For example, a software developer may click on or close to the GetPeople text.

Sometimes the term mouse click, hovering, keyboard, or some other input is mentioned herein, but it is to be understood that any other form of input may be substituted for the actions above without departing from the spirit or scope of aspects of the subject matter described herein.

For example, in one embodiment, a Natural User Interface (NUI) may be used to provide the input. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

After the editor receives input, the editor may interact with a folding view manager to obtain a folded view of the method GetPeople 220. A folded view of the method GetPeople 220 is illustrated in FIG. 3. In FIG. 3, the window 300 includes a pane 315 in which folded view 325 is inline with the code segment that includes the method GetPeople. The folded view 325 may be indented and/or have a graphical element (e.g., the line 330) that helps indicate the folded view 325.

To obtain the code segment shown in the folded view 325 a folding view manager may obtain the code segment from another file or repository that includes the code segment. It will be appreciated by those skilled in the art that having a folding view such as that shown in FIG. 3 allows a software developer to view called code without going through a cumbersome set of steps to locate the code, load the code, and view the code. Furthermore, the folded view may also allow a software developer to see both the calling code segment and the called code segment without requiring the software developer to navigate between multiple screens.

Although a folded view is sometimes described herein as including a code segment, in other embodiments, a folded view may include other data. For example, a folded view may include text and other data that indicates a change history for the code (e.g., see FIG. 7). As another example, a folded view may include graphics such as an image referenced by code. As another example, a folded view may include tabular data that was generated the last time the code executed. As yet another example, a folded view may include documentation associated with code.

Folded views may span views of code of different programming languages. For example, some HTML code may reference JavaScript code. The JavaScript code may be shown in a folded view. The JavaScript code may reference C# code on a server. The C# code from the server may be shown in a folded view inline with the calling reference in the JavaScript code. The C# code may call some Basic code that may be shown in yet another folded view inline with the calling reference in the C# code. This may be repeated to any number of code segments written in different programming languages.

Figure 5:
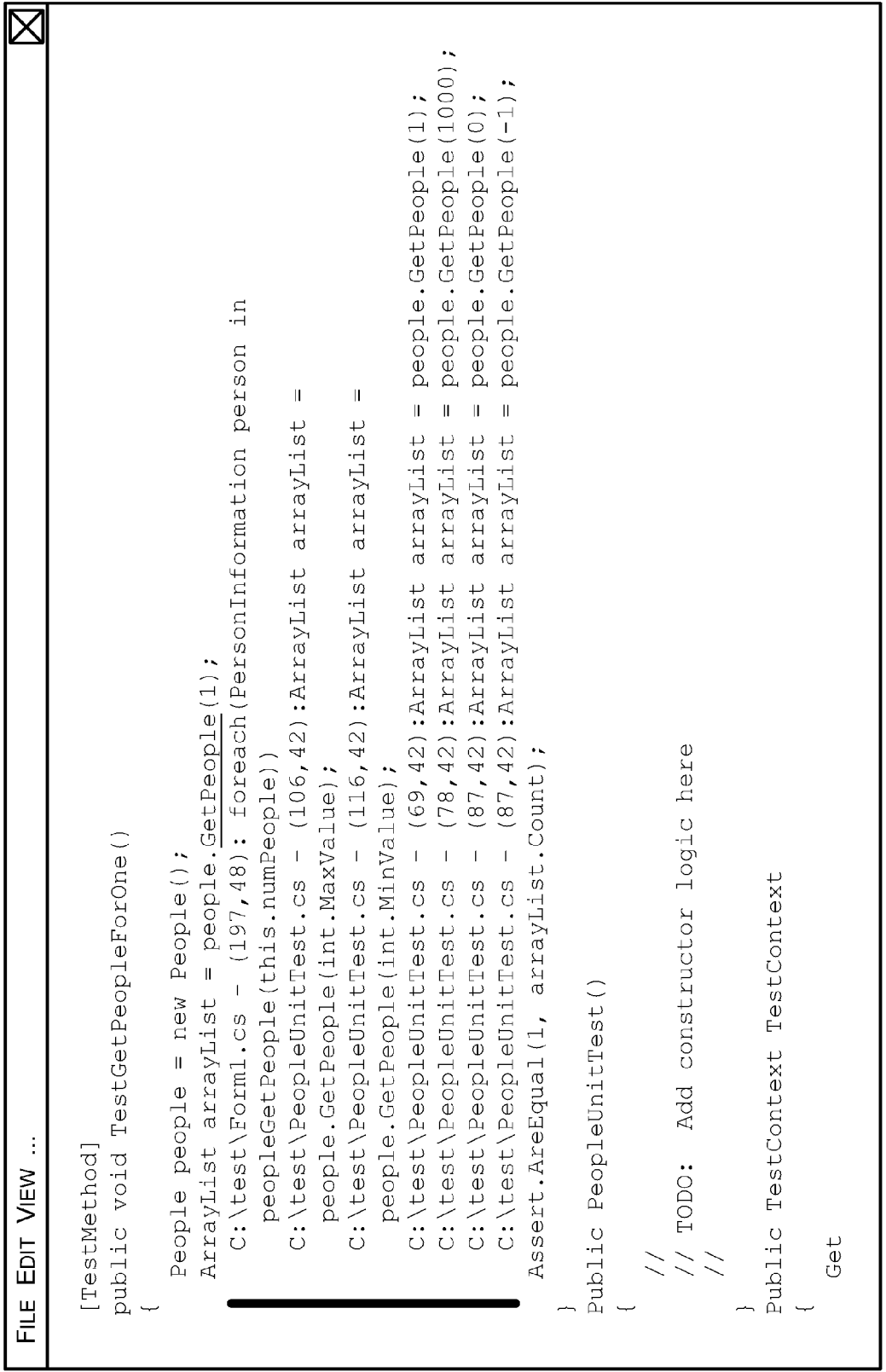

The folding view may be represented by a graphical element that allows a software developer to expand or collapse the folding view. A graphical element may include an icon, highlighted characters, a line of text, a method, variable, or other name, or other graphical data, a combination of two or more of the above, or the like. For example, FIG. 5 shows one or two lines of text to represent each folded view corresponding to the method GetPeople. By clicking on one of the lines of text, a software developer may cause a code segment associated with the text to be displayed inline with the other code. Collapsing a folded view may cause any non-collapsed children views to also be collapsed.

Figure 4:
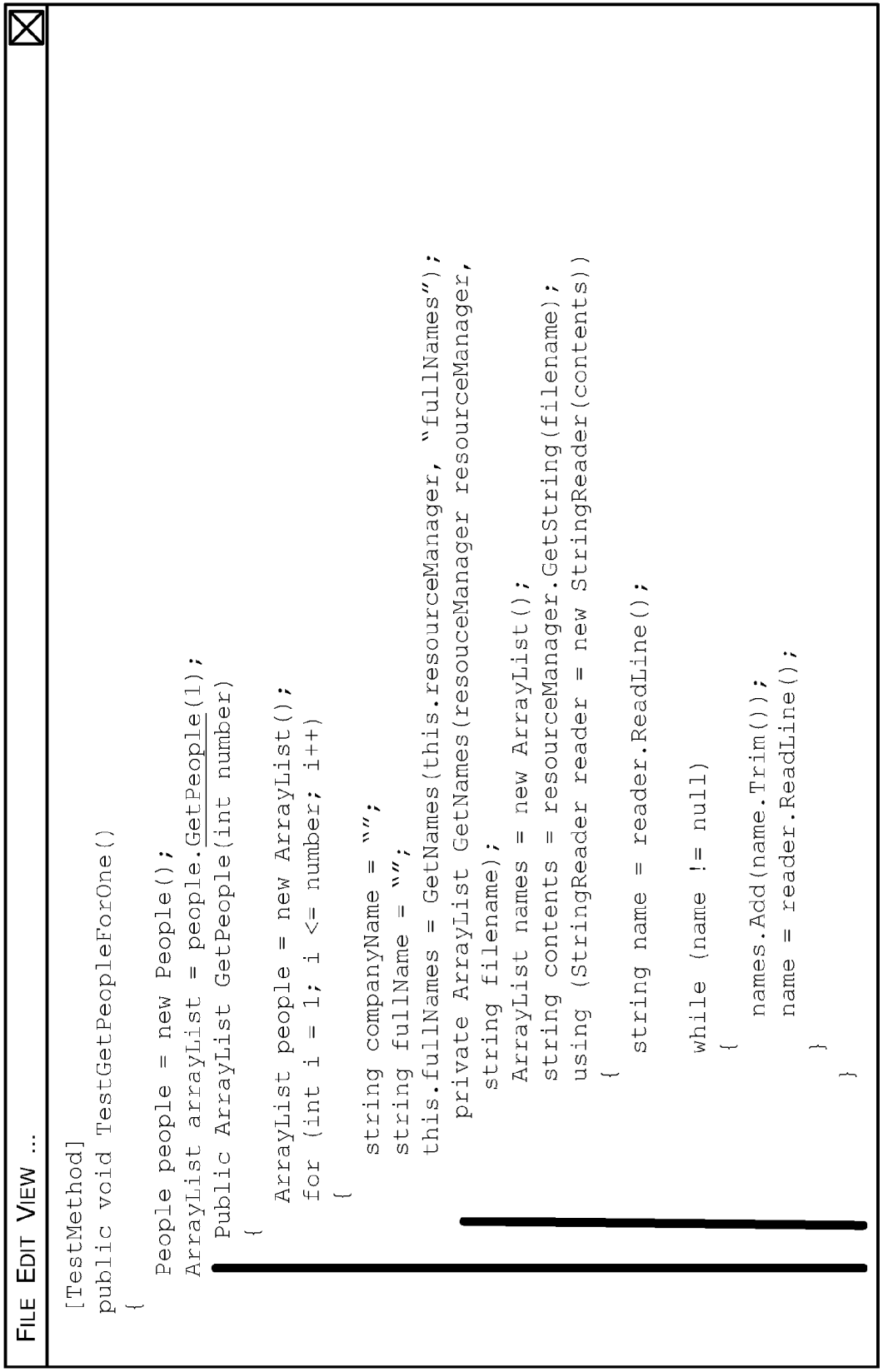

One code segment may be the parent of one or more folded views, which may include code segments that may be the parents of one or more other folded views, and so forth. Some examples of this are illustrated in FIGS. 4 and 6.

A symbol such as a variable may be correlated across folded views using static or runtime techniques. Symbol correspondences may then be highlighted across views. For example, if the variable X is passed into a single-parameter function and the name of that parameter is Y, all instances of Y can be automatically highlighted in the child method and in any other child methods that are expanded through code folding from the child method. This allows software developers to readily identify value flow across complex, hierarchical calling trees. An example of this is illustrated in FIG. 6 in which the variable DateAdded is bolded and correlated across folded views.

Returning to FIG. 2, as mentioned previously, the method GetPeople 220 may be highlighted or not highlighted depending on implementation. In one example, in response to receiving hovering input associated with the method GetPeople 220, additional information may be displayed. For example, metadata about a referenced code segment may be displayed. For example, the metadata displayed may include a name, parent class, file name, size of graphics image, when the code segment was created, an encoding scheme used to encode an image, other metadata, or the like.

Furthermore, folded views may closely match the sequence of calls a program may make when executing. For example, if function A calls function B that calls function C, folded views may show function B folded in function A and function C folded within function B in locations corresponding to where the code is called.

A code segment that is to be shown by a folded view may be larger than what is allowed for display in the folded view. For example, the code segment may have lines of code that are too wide for display in the folded view. As another example, the code segment may have lines of code that exceed a threshold of lines of code that may be displayed in the folded view. In this case, the folding view manager may display one or more graphical elements (e.g., ellipses, scroll bars, other graphical elements, or the like) that indicate that more content is available than is shown. These graphical elements are sometimes referred to herein as elision marks.

A software developer may click or otherwise interact with an elision mark to cause more content to be displayed. In response, more of the code segment up to another threshold may be displayed together with additional elision marks. The software developer may continue to interact with the elision marks to cause additional portions of the code segment to be displayed until a desired amount or the entire code segment is displayed.

In one implementation, a software developer may allowed an option to "tear off" a code segment and open it in a traditional file editor as a new standard tab, windows, or other element in the top-level user interface. In this implementation, when a code segment is torn off, the starting line of the code segment may be displayed in the graphical element.

An interface that displays code segments using folded views may be implemented to be consistent with existing interactions available via the development environment. For example, an undo operation may undo the last action visible on screen. As another example, a find next command may find the next instance of the searched-for text—including or not including folded views (e.g., depending on configuration)—in the sequence in which they are encountered. As yet another example, the scroll wheel and the vertical scrollbar may manage a viewport. As yet another example, a save operation may save underlying buffer(s) of the editor.

The examples above are exemplary only and are not intended to be all-inclusive or exhaustive of how folded views may be consistent with existing interactions available via a development environment. Based on the teachings herein, one skilled in the art may recognize other ways of implementing an interface that displays code segments using folded views in a manner consistent with existing interactions available via a development environment without departing from the spirit or scope of aspects of the subject matter described herein.

In one example, returning to FIG. 1, the source code editor 125 may be responsive to editing instructions such that an editing instruction that would involve code immediately below a reference to a folded view is applied to the code segment of the folded view prior to being applied to any portion of a code segment that is below the graphical element. For example, referring to FIG. 3, a search for the word "arrayList" may search through the code segment above the folded view 325, then through code segment of the folded view 325, then through code below the folded view 325.

Figure 8:
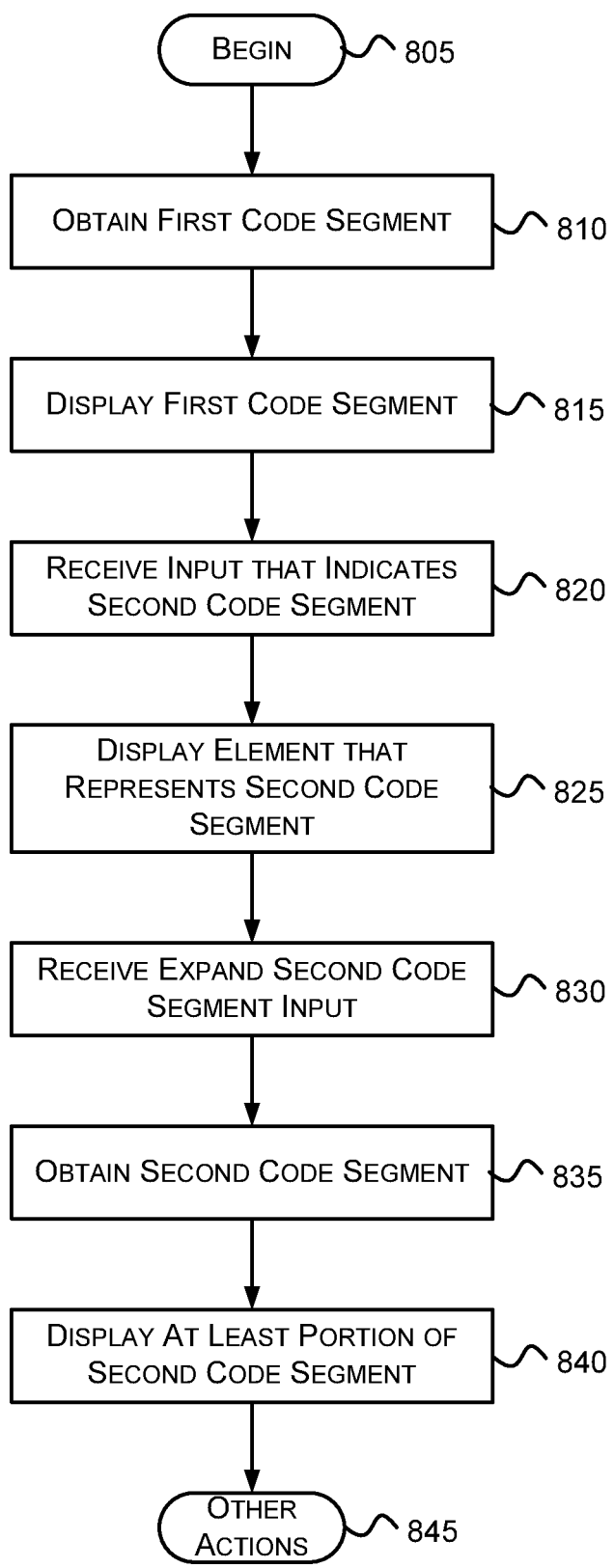
FIGS. 8-9 are flow diagrams that generally represent exemplary actions that may occur in accordance with aspects of the subject matter described herein.
Figure 9:
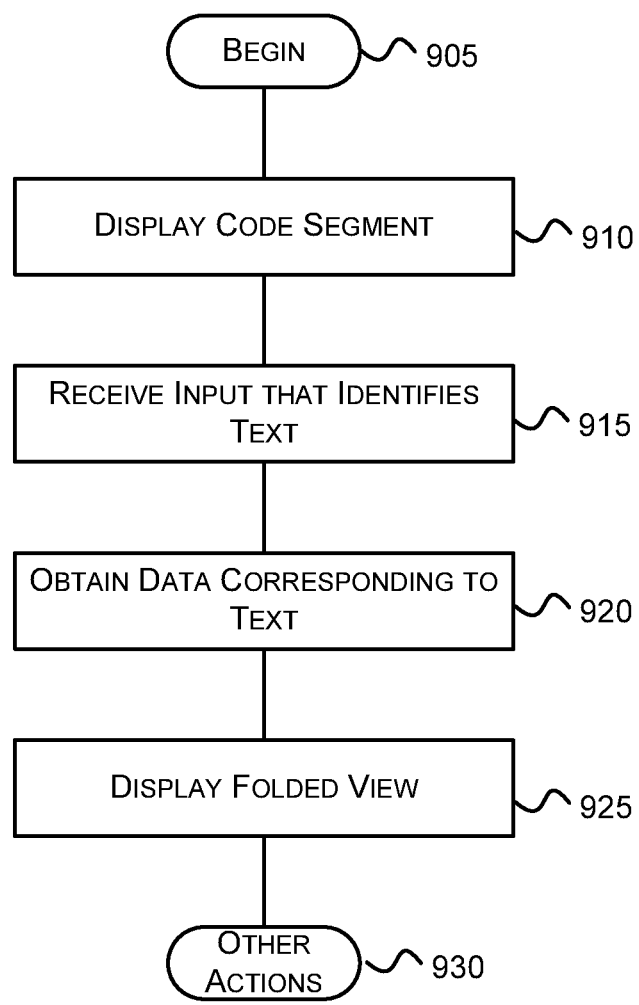

FIGS. 8-9 are flow diagrams that generally represent exemplary actions that may occur in accordance with aspects of the subject matter described herein. For simplicity of explanation, the methodology described in conjunction with FIGS. 8-9 are depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 8, at block 805, the actions begin.

At block 810, a first code segment is obtained. For example, referring to FIG. 1, a software developer may select a code file using the source code editor 125 and may cause the code of the code file to be loaded into memory and displayed on the display 115.

At block 815, the first code segment is displayed on a graphical interface of a software development environment. For example, referring to FIGS. 1 and 2, the code segment shown in pane 215 may be displayed on the display 115.

At block 820, input that indicates a reference to a second code segment may be received. As mentioned previously, the second code segment may be included in a file or other repository that includes the first code segment or in a separate file. For example, referring to FIGS. 1 and 2, the software development system 105 may receive a right-click, hovering, or other form of input that identifies the method GetPeople 220. For example, a software developer may highlight the method GetPeople 220 to indicate a name of a second code segment that is to be represented by a folded view.

At block 825, a graphical element is displayed that represents a second code segment. For example, referring to FIG. 2, the method GetPeople 220 is underlined to indicate that the method GetPeople 220 is associated with other code that may be represented in a folded view. As another example, referring to FIG. 5, one or two lines are shown for each folded view to indicate other code associated with the method GetPeople.

At block 830, an instruction to expand the folded view is received. For example, referring to FIG. 2, a software developer may right click on the method GetPeople 220 and indicate that the code for the method is to be expanded and shown inline.

At block 835, code of the second code segment is obtained. For example, referring to FIG. 1, the fetching manager 130 may obtain the code of the second code segment by opening a file and loading the code into memory.

At block 840, at least a portion of the second code segment is displayed. For example, referring to FIG. 3, the entire code for the GetPeople method is displayed but in FIG. 4 only a portion code segments for each of the folded views is displayed.

At block 845, other actions, if any, are performed. For example, a software developer may indicate through input to a software development system that a folded view is to be torn off. In response, the code segment may be displayed in a separate display area (e.g., new tab, window, or other element).

As another example, hovering input may be received associated with the second code segment. In response, metadata may be displayed about the second code segment Turning to FIG. 9, at block 905, the actions begin. At block 910, a code segment of a program is displayed. For example, referring to FIG. 2 a code segment is displayed in the pane 215.

At block 915, input that identifies text of the code segment is received. For example, referring to FIG. 2, a software developer may click on the method GetPeople 220. As another example, receiving input that identifies text of the first code segment may include receiving input that identifies a name associated with the data.

At block 920, data corresponding to the text is obtained. For example, referring to FIG. 3, data corresponding to the code shown in folded view 325 may be obtained. As another example, if the text referred to a graphical image, data corresponding to the image may be obtained.

At block 925, inline with the text, a folded view is displayed of the data. Displaying the data may include displaying one or more of: a second code segment, text, or graphics. For example, referring to FIG. 3, the folded view 325 is displayed inline with the call to people.GetPeople(1). As another example, if the text referred to a graphical image, the graphical image may be shown inline with the text.

At block 930, other actions, if any, may be performed. For example, a graphical element may be displayed that represents the folded view. This graphical element may be displayed below and adjacent to the text such that the graphical element is displayed inline with the first code segment. The graphical element may allow a software developer to provide expand input (e.g., by selecting, hovering over, clicking on, or otherwise interacting with the graphical element). In response to receiving expand input, data corresponding to the graphical element may be displayed and indented from a margin of the code segment.

As can be seen from the foregoing detailed description, aspects have been described related to folded views for a development environment. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A device comprising:
 a source code editor configured to receive editing instructions related to a first code segment, and
 a folding view manager configured to cause a display to render, inline with the first code segment, a reference included in the first code segment a graphical element that represents a folded view of a second code segment referenced by the reference, the folding view manager further configured to correlate a symbol across the first code segment and the folded view of the second code segment, the folding view manager further configured to highlight the correlated symbol across the first code segment and the folded view of the second code segment.

2. The device of claim 1, further comprising a fetching manager configured to obtain code corresponding to the second code segment in response to receiving an indication that the folded view is to be expanded.

3. The device of claim 1, wherein the source code editor is further configured to respond to editing instructions such that an editing instruction that would involve code immediately below the reference is applied to the second code segment prior to being applied to any portion of the first code segment that is below the graphical element.

4. The device of claim 1, wherein the first code segment of the program is obtained from a first file and the second code segment is obtained from a second file.

5. The device of claim 1, wherein at least a portion of the second code segment is displayed indented from a margin of the first code segment.

6. The device of claim 5, the folding view manager is further configured to correlate the symbol across a folded view of a third code segment and to highlight the correlated symbol across the folded view of the third code segment.

7. A method implemented at least in part by a computer, the method comprising:
 displaying a first code segment of a program on a graphical interface of a software development environment;
 receiving input that indicates a reference to a second code segment of the program;
 on the graphical interface, inline with the first code segment, displaying a folded view of the second code segment;
 on the graphical interface, inline with the first code segment, displaying a folded view of a third code segment;
 on the graphical interface, correlating a symbol across the folded view of the second code segment and the folded view of the third code segment; and
 on the graphical interface highlighting the correlated symbol across the folded view of the second code segment and the folded view of the third code segment.

8. The method of claim 7, further comprising obtaining the first code segment of the program from a first file and obtaining the second code segment from a second file.

9. The method of claim 7, wherein receiving input that indicates a reference to a second code segment of the program comprises receiving input that indicates a name of the second code segment.

10. The method of claim 7, further comprising displaying a graphical element that represents a folded view of the second code segment by displaying the graphical element on a line immediately below a line that includes the reference.

11. The method of claim 7, further comprising receiving input to display the second code segment and in response displaying at least a portion of the second code segment inline with the reference and indented from a margin of the first code segment.

12. The method of claim 11, further comprising within the portion of the second code segment displaying the folded view of the third code segment.

13. The method of claim 11, further comprising displaying a graphical element that indicates that not all the second code segment is displayed.

14. The method of claim 7, further comprising on the graphical interface, inline with the first code segment, displaying a plurality of graphical elements, each of the graphical elements representing a folded view of one of a plurality code segments.

15. The method of claim 7, further comprising receiving search input and in response searching first through a portion of the first code segment that is before the second code segment, then searching through the second code segment, then searching through a portion of the first code segment that is after the second code segment.

16. The method of claim 7, further comprising receiving hovering input associated with second code segment and in response displaying metadata about the second code segment.

17. The method of claim 7, further comprising correlating the symbol across the first code segment and highlighting the correlated symbol across the first code segment.

18. In a computing environment, a system, comprising:
 a software development environment operable to receive input for software development activities, the software development environment including:
  a display operable to render text associated with a first code segment of a software program,
  a source code editor operable to receive editing instructions related to the first code segment, and
  a folding view manager operable to cause the display to render, inline with the first code segment, a reference included in the first code segment a graphical element that represents a folded view of a second code segment referenced by the reference, the folding view manager further operable to cause the display to render a graphical element that represents a folded view of a third code segment, the folding view manager further operable to correlate a symbol across second code segment and the folded view of the third code segment, the folding view manager further operable to highlight the correlated symbol across the folded view of the second code segment and the folded view of the third code segment.

19. The system of claim 18, the folding view manager further operable to correlate the symbol across the first code segment and to cause the display to highlight the correlated symbol across the first code segment.

20. The system of claim 18, further comprising a fetching manager operable to obtain code corresponding to the second code segment in response to receiving an indication that the folded view is to be expanded.

\* \* \* \* \*